United States Patent [19]

King

[11] Patent Number: 4,478,243

[45] Date of Patent: Oct. 23, 1984

[54] VALVE ASSEMBLY

[75] Inventor: Robert W. King, Sidney, Ohio

[73] Assignee: Copeland Corporation, Sidney, Ohio

[21] Appl. No.: 564,283

[22] Filed: Dec. 22, 1983

Related U.S. Application Data

[60] Division of Ser. No. 430,322, Sep. 30, 1982, Pat. No. 4,445,534, which is a division of Ser. No. 219,849, Dec. 23, 1980, Pat. No. 4,368,755, which is a continuation of Ser. No. 971,309, Dec. 20, 1978, abandoned.

[51] Int. Cl.³ ............................................. F16K 15/08
[52] U.S. Cl. ............................. 137/512.1; 137/512.2; 137/512.3; 137/516.13; 137/543.17; 137/843; 417/566
[58] Field of Search ................ 137/512.3, 540, 543.17, 137/843, 512.1, 512.15, 512.2, 516.13, 516.15; 417/566, 567, 569

[56] References Cited

U.S. PATENT DOCUMENTS

| | | |
|---|---|---|
| 310,459 | 1/1885 | Nicholson et al. |
| 367,726 | 8/1887 | Penney . |
| 512,369 | 1/1894 | Garris . |
| 520,349 | 5/1894 | Zies . |
| 542,083 | 7/1895 | De Laval . |
| 768,042 | 8/1904 | Ginaca ........................ 137/516.29 X |
| 955,822 | 4/1910 | Mayhew . |
| 976,010 | 11/1910 | Thompson . |
| 1,109,154 | 9/1914 | Thomas . |
| 1,287,751 | 12/1918 | Richards . |
| 1,354,315 | 9/1920 | Longacre .................. 137/543.17 X |
| 1,407,518 | 2/1922 | Dennedy . |

(List continued on next page.)

FOREIGN PATENT DOCUMENTS

| | | |
|---|---|---|
| 144437 | 4/1950 | Australia . |
| 6400965 | 3/1967 | Australia . |
| 681798 | 3/1964 | Canada . |
| 452903 | 11/1927 | Fed. Rep. of Germany . |
| 1080350 | 4/1960 | Fed. Rep. of Germany . |
| 1550254 | 7/1969 | Fed. Rep. of Germany . |
| 2426378 | 1/1975 | Fed. Rep. of Germany . |
| 2443030 | 3/1975 | Fed. Rep. of Germany . |
| 940160 | 12/1948 | France . |
| 1134166 | 4/1957 | France . |
| 2100429 | 3/1972 | France . |
| 2366465 | 4/1978 | France . |

(List continued on next page.)

OTHER PUBLICATIONS

"Machine Design", (U.S.), vol. 42, p. 146, Nov. 12, 1970.

"A Look at Problem-Solving with Vespel Parts", Du Pont Company.

*Primary Examiner*—Robert G. Nilson
*Attorney, Agent, or Firm*—Harness, Dickey & Pierce

[57] ABSTRACT

There are disclosed herein several embodiments of a pressure responsive discharge valve assembly particularly adapted for use in reciprocating type gas compressors. The valve assembly includes a discharge passage valve seat of frusto conical shape in which a generally complementary shaped light-weight valve member is disposed. The valve member is preferably formed from a polymeric material, but may also be formed of metal. The materials used and the relative geometry of the valve seat and member are such as to reduce clearance or reexpansion volume, provide quiet closure with good sealing, long life and high speed operation, and still have the required flow areas at low valve lifts, thereby providing improved flow characteristics and efficiency. The included angles of the valve and seat are slightly different to provide progressive closing and sealing without permanent deformation. The valve concepts are also disclosed embodied in two other known types of valves in which the valve element is provided with a central opening and associated closure means to provide additional discharge flow area. The closure means in one embodiment is in the form of a fixed member and in another embodiment is in the form of a second separately biased movable valve disc member. The discharge valve of the present invention is also shown in combination with several different types of known suction valves.

29 Claims, 15 Drawing Figures

U.S. PATENT DOCUMENTS

| | | |
|---|---|---|
| 1,425,663 | 8/1922 | Lawhead . |
| 1,467,445 | 9/1923 | Meyers et al. . |
| 1,476,794 | 12/1923 | Berry . |
| 1,490,141 | 4/1924 | Stoms . |
| 1,494,834 | 5/1924 | Hack . |
| 1,514,233 | 11/1924 | Searles . |
| 1,539,617 | 5/1925 | Williston . |
| 1,628,096 | 5/1927 | Worth . |
| 1,637,821 | 8/1927 | Heideman . |
| 1,652,978 | 12/1927 | Enock . |
| 1,659,817 | 2/1928 | Halvorsen . |
| 1,719,572 | 7/1929 | Stoll . |
| 1,871,285 | 8/1932 | Tursky . |
| 1,976,098 | 10/1934 | Smith . |
| 1,985,841 | 12/1934 | Shepherd et al. . |
| 2,025,240 | 12/1935 | Higham . |
| 2,349,137 | 5/1944 | Brown . |
| 2,358,950 | 9/1944 | Trautman . |
| 2,359,486 | 10/1944 | Magis . |
| 2,366,004 | 12/1944 | Crittenden . |
| 2,386,726 | 10/1945 | Tannehill . |
| 2,579,667 | 12/1951 | Hanson . |
| 2,900,999 | 7/1959 | Courtot . |
| 2,930,401 | 3/1960 | Cowen . |
| 2,949,929 | 8/1960 | Moore . |
| 3,029,835 | 4/1962 | Biello et al. . |
| 3,092,139 | 6/1963 | Rodgers et al. . |
| 3,229,864 | 1/1966 | Roder . |
| 3,332,437 | 7/1967 | Hallen . |
| 3,548,868 | 12/1970 | Mullaney . |
| 3,664,371 | 5/1972 | Schneider . |
| 3,770,009 | 11/1973 | Miller . |
| 3,889,710 | 6/1975 | Brost . |
| 3,898,999 | 8/1975 | Haller .............................. 137/512.1 |
| 3,999,898 | 12/1976 | Chomczyk . |
| 4,060,098 | 11/1977 | Bares et al. . |

FOREIGN PATENT DOCUMENTS

| | | |
|---|---|---|
| 679079 | 9/1952 | United Kingdom . |
| 697495 | 9/1953 | United Kingdom . |
| 905661 | 9/1962 | United Kingdom . |
| 988894 | 4/1965 | United Kingdom . |
| 995929 | 6/1965 | United Kingdom . |
| 1015412 | 12/1965 | United Kingdom . |
| 1090740 | 11/1967 | United Kingdom . |
| 1199523 | 7/1970 | United Kingdom . |
| 1241365 | 8/1971 | United Kingdom . |
| 1265497 | 3/1972 | United Kingdom . |
| 1350287 | 4/1974 | United Kingdom . |

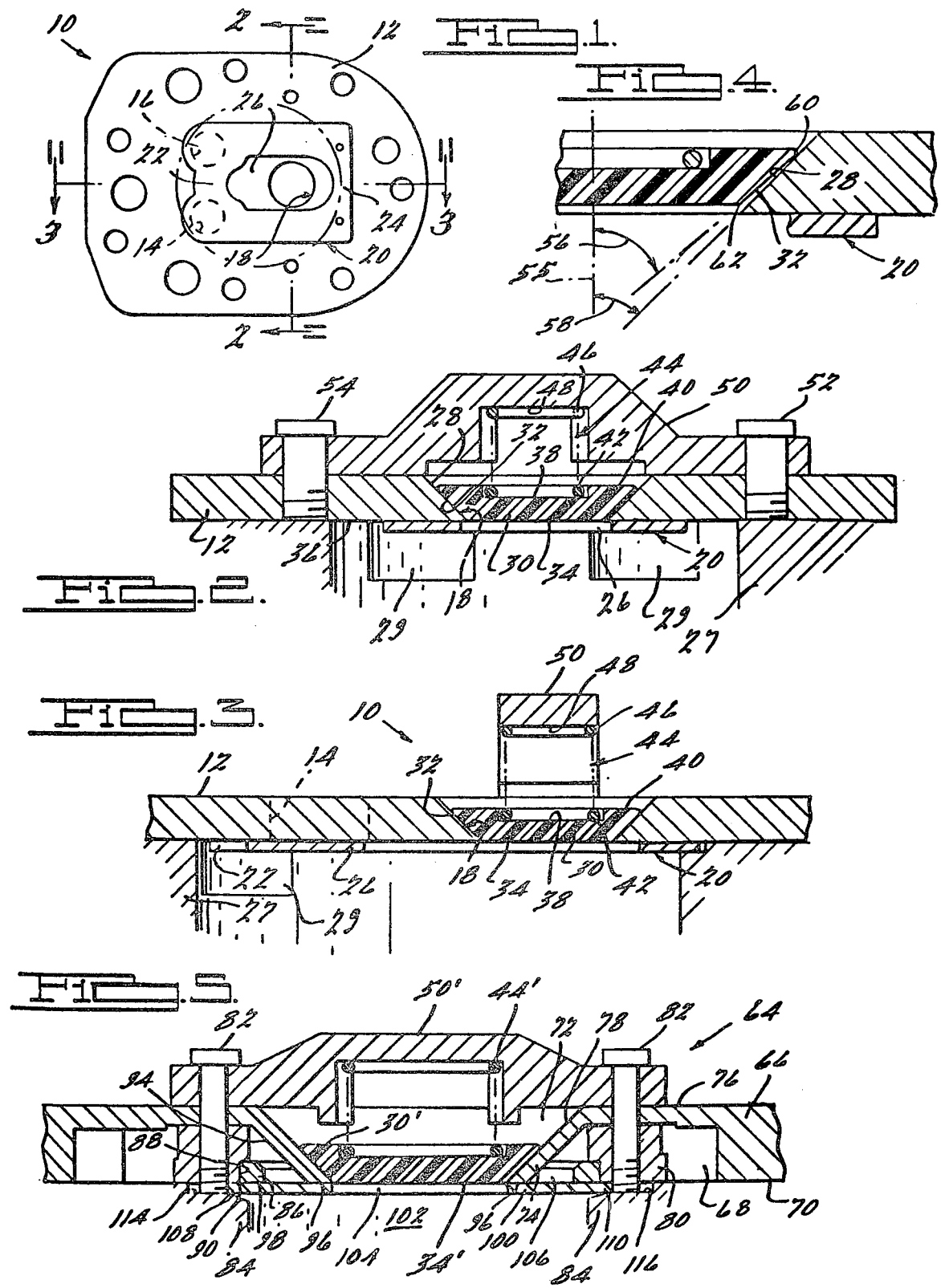

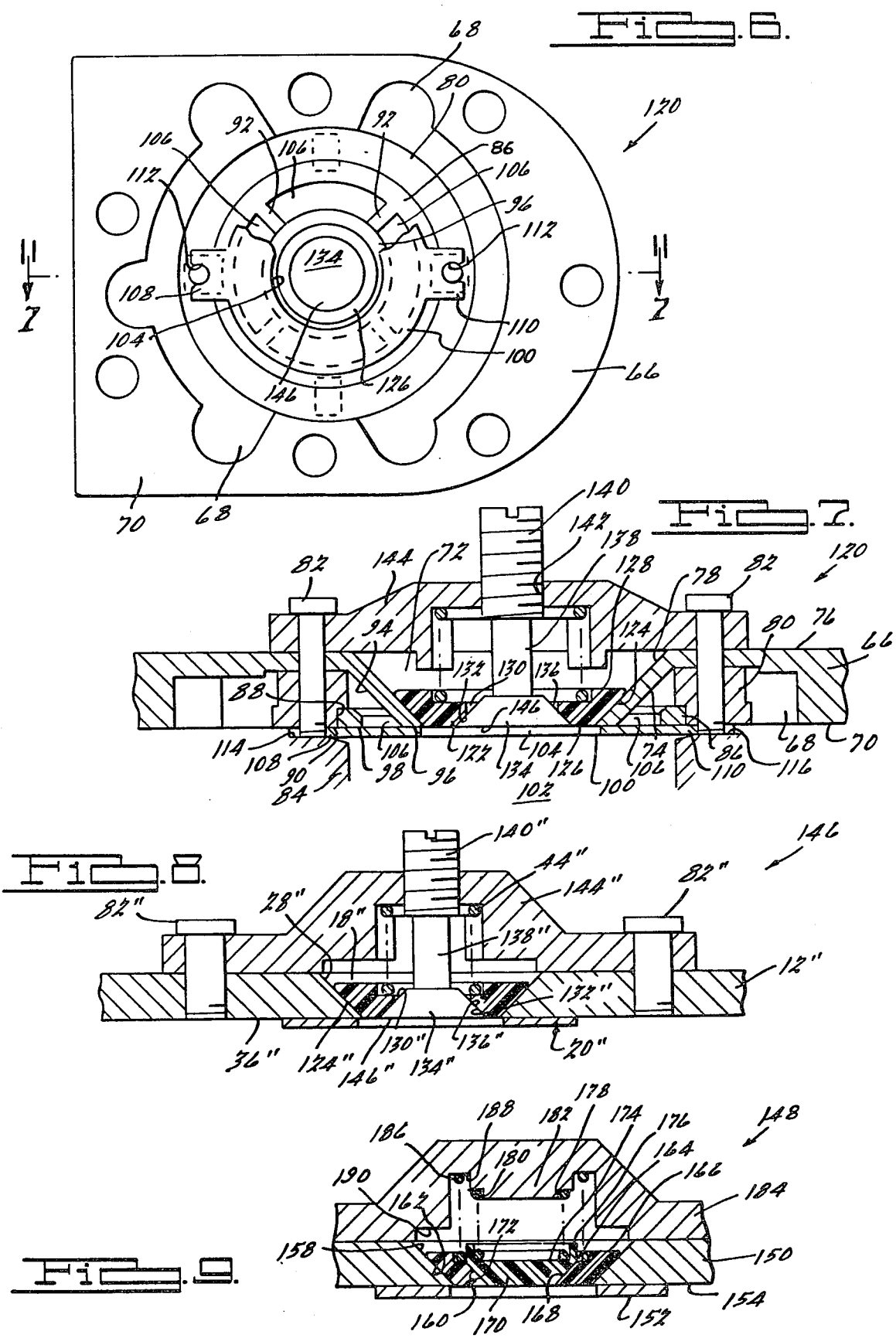

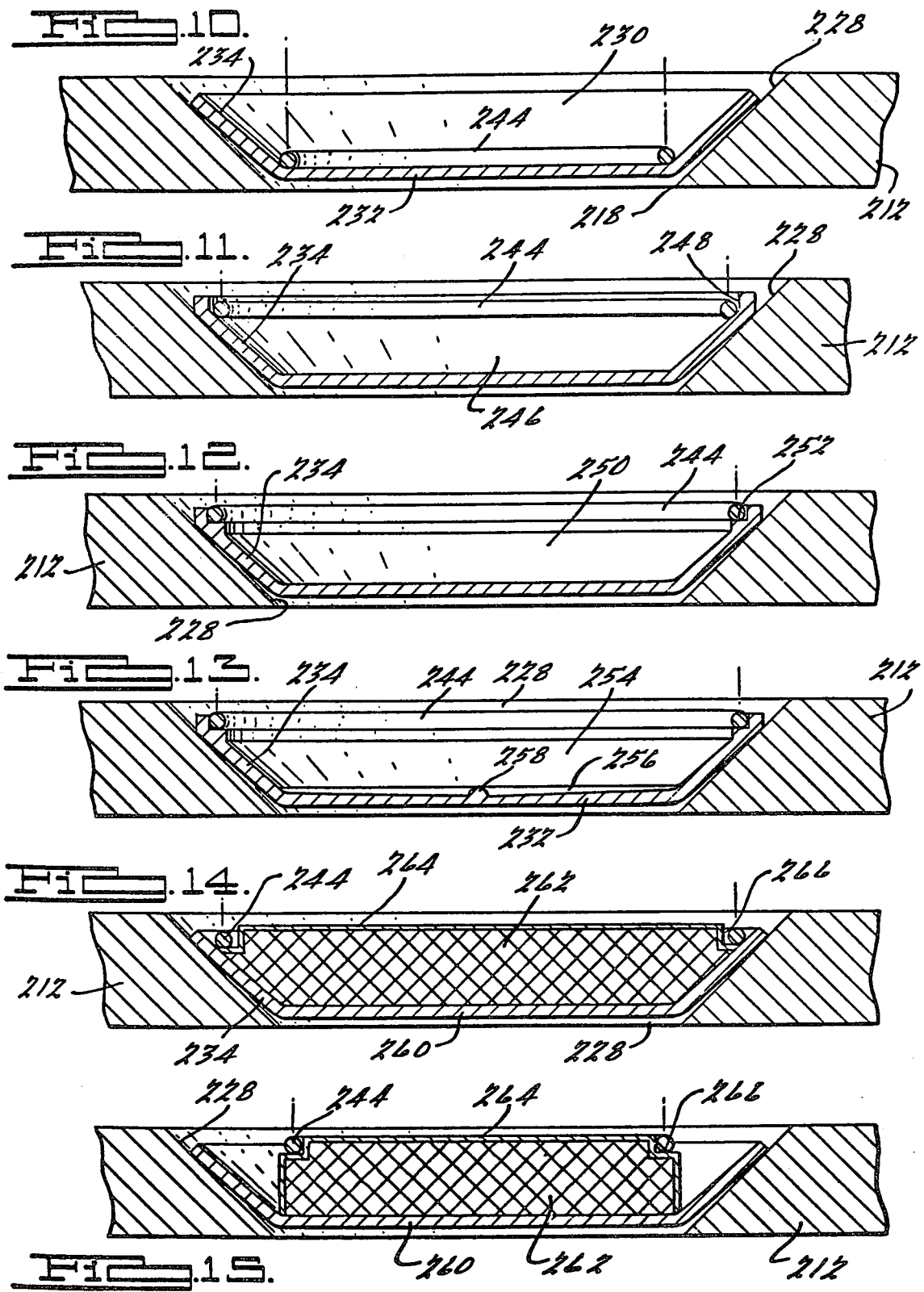

VALVE ASSEMBLY

This is a division of application Ser. No. 430,322, filed Sept. 30, 1982, now U.S. Pat. No. 4,445,534, which is a divisional application of prior application Ser. No. 219,849, filed Dec. 23, 1980, now U.S. Pat. No. 4,368,755, which was a continuation of prior application Ser. No. 971,309, filed Dec. 20, 1978, now abandoned.

BACKGROUND AND SUMMARY OF THE INVENTION

The present invention relates generally to pressure responsive valve assemblies and more particularly to such valve assemblies adapted for use in reciprocating piston type compressors, such as refrigeration compressors.

Reciprocating piston type compressors typically employ suction and discharge pressure actuated valving mounted at the end of the cylinder between the head and cylinder housing. In designing these valve assemblies it is of critical importance to overall system operation to provide a sufficiently large port area to permit the flow of a maximum volume of fluid within a given time period and at an acceptably small pressure drop. This is particularly true for refrigeration compressors employed in air conditioning systems because of the relatively high mass flow rates generally required in such systems.

Associated and conflicting with the desirability to maximize port area for a given size cylinder is the need to reduce the weight of the moving valve member so as to limit the inertia effect thereof. Noise of operation should also be minimized. These aspects take on increasing importance with high speed compressors.

Another important design objective is to minimize the reexpansion or clearance volume of the cylinder. The valving and cylinder top end wall should have a shape complementary with that of the top of the piston and as flat as possible to enable the piston to reduce the volume of the compression chamber to an absolute minimum during the compression stroke without restricting gas flow. While it may be possible to accomplish this objective by design of complex piston head shapes, manufacturing thereof becomes expensive, assembly more difficult, and throttling losses generally occur as the piston approaches top dead center. Reduction of reexpansion volume is of great importance in refrigeration compressors having relatively low mass flow rates, such as those units employed in very low temperature refrigeration systems, as well as in units for heat pump applications.

It is therefore the primary object of this invention to provide an improved valve and an improved valve and seat combination for use as a discharge valve in a reciprocating gas compressor, such as, for example, the compressors used in refrigeration equipment, which valve and valve-seat combination improves the efficiency of the compressor and is characterized by its improved flow characteristics at all valve lifts, good sealing without permanent deformation of the valve, long life, quietness in operation and its ability to operate in high speed compressors.

The present invention provides an improved valve assembly utilizing a valve member the entire area of which is subjected to valve actuating pressure differentials and which is fabricated in a light-weight manner so that high force to weight ratios are obtained for a given port size. This maximizes acceleration and hence efficiency, especially at high speeds. Further, the design of the valve member and associated valve plate is such as to present a substantially flat, flush end wall for the compression chamber. Thus, the reexpansion volume for the compression chamber is substantially reduced over conventional valving arrangements and simple flat topped pistons (or pistons with a minimum of top surface contour) can be used. Also, because of the light-weight characteristics of the valve member, valving action is faster and port size may be increased without detrimental inertial effects. The use of a polymeric material for the valve member in the preferred embodiment and the relative geometries of the valve member and valve seat also reduce valve noise generated by the recurring impact of the valve member and valve seat. With the present invention valve port area is not a function of reexpansion volume; each can be optimized independently. Therefore, the valve assembly of the present invention is ideally suited for use both in air conditioning applications as well as heat pumps and low temperature units. Further, the present arrangement can be used to maximize the use of the cylinder head area for valving.

Additional advantages and features of the present invention will become apparent from the subsequent description and the appended claims taken in conjunction with the accompanying drawings.

BRIEF DESCRIPTION OF THE DRAWINGS

FIG. 1 is a bottom plan view (from inside the cylinder chamber) of a pressure responsive discharge valve assembly utilizing a polymeric valve member in accordance with the present invention, shown in combination with a reed type suction valve;

FIG. 2 is an inverted sectional view of the valve assembly of FIG. 1, the section being taken along line 2—2 thereof;

FIG. 3 is an inverted sectional view of the valve assembly of FIG. 1, the section being taken along line 3—3 thereof;

FIG. 4 is an enlarged fragmentary view of a portion of a valve seat and associated valve member in accordance with the present invention illustrating in an exaggerated manner the relative angles of inclination of the mating surfaces thereof, the valve member being shown in a position in which it is just beginning to seat;

FIG. 5 is a sectional view similar to and showing the valve assembly of FIG. 2 but illustrating it in combination with a ring type suction valve;

FIG. 6 is a bottom plan view (from inside the cylinder chamber) of another embodiment of the discharge valve assembly of the present invention, utilizing a polymeric valve member;

FIG. 7 is an inverted sectional view of the embodiment of FIG. 6, the section being taken along line 7—7 thereof;

FIg. 8 is a sectional view similar to and showing the valve assembly of FIG. 7 but illustrating it in combination with a reed type suction valve;

FIG. 9 is a fragmentary sectional view similar to that of FIG. 7 but illustrating yet another embodiment of the discharge valve assembly of the present invention utilizing a polymeric valve member; and FIGS. 10 through 15 are fragmentary sectional views similar to FIG. 4, but illustrating several embodiments of the valve member of the present invention formed out of metal.

DESCRIPTION OF THE PREFERRED EMBODIMENTS

Referring now to the drawings and in particular to FIGS. 1 through 3, there is illustrated a valve assembly in accordance with the present invention indicated generally at 10. Valve assembly 10 comprises a conventional valve plate 12 having a pair of spaced suction passages 14 and 16 extending therethrough and a combined discharge passage and valve seat 18. A conventional reed type suction valve member 20 is also provided having an end portion 22 disposed in overlying valving relationship to suction passages 14 and 16, an opposite end portion 24 secured to valve plate 12 and an elongated centrally disposed opening 26 overlying passage 18. Recesses 29 are provided in the cylinder bore to provide clearance for the tips of the suction valve when it opens. The valve plate is mounted in the usual manner over a compressor cylinder defined by cylinder block 27 (in FIG. 1 the position of the cylinder bore is shown in phantom).

As best seen with reference to FIGS. 2 and 3, discharge passage 18 is of a frusto conical shape being defined by outwardly diverging sidewalls 28. A discharge valve member 30 in the form of a frusto conically shaped disc is disposed within discharge passage 18 with sidewalls 32 sealingly engaging sidewalls 28. As shown, discharge valve member 30 is of a size and shape relative to discharge passage 18 so as to place lower surface 34 thereof in substantially coplanar relationship to lower surface 36 of valve plate 12. Discharge valve member 30 is also provided with a recess 38 in upper surface 40 thereof which receives an end portion 42 of a biasing means in the form of a helical compression spring 44, the opposite end 46 of which extends upwardly into engagement with a recess 48 provided in a bridge-like retainer member 50. The valve is essentially pressure actuated, and spring 44 is chosen primarily to provide stability and also an initial closing bias and a preload to establish an initial seal. Other types of springs than coil springs may of course be used for this purpose. Retainer member 50, which also serves as a stop to limit opening movement of the valve element, is secured to valve plate 12 by suitable fasteners 52 and 54.

Generally speaking, discharge valve member 30 is preferably formed from a high performance polymeric material, and preferably a molding resin, such as polyimide, aramid, polyester, polyphenylene sulfide, and poly (amide-imide) resins. These materials have high strength, high temperature resistance, are relatively lightweight, are unreactive, and are relatively compliant. Although it is difficult to numerically define all of the desirable parameters for this material, it is thought that best results will be obtained using materials having a tensile strength to weight ratio greater than approximately $3.25 \times 10^5$ psi/lb$_m$ and a flexural strength to flexural modulus ratio less than approximately 0.04. In addition, the material should have a heat distortion temperature greater than 450° F., high wear resistance, high internal dampening characteristics (for noise attenuation and sealing), compatibility with the environment, ease of manufacture (e.g., by compression or injection molding), low creep rate, and a high impact strength (preferably having a notched Izod impact strength greater than approximately 0.8).

At the present time the preferred material for the valve member is "Vespel", a polyimide resin available from duPont Company, Wilmington, Del. The compositions identified as "SP-1" and "SP-21" have been found to give excellent results. The use of such a polymeric composition for discharge valve member 30 facilitates easy fabrication, such as by molding, and the relative light weight of the valve member facilitates high speed operation due to the reduced inertia of the valve and the ability to use lighter springs, as well as reducing noise generated by contact of the valve and valve seat. The "Vespel" material is ideally suited for such application as it is able to resist degradation from relatively high temperatures and is unaffected by either refrigerant gas or lubricant. It has been found that the maximum operating temperature to which the refrigerant and lubricating oil can be subjected without damage is less than that for "Vespel". "Vespel" is also compliant enough to seal without permanent deformation.

Other suitable polymeric materials having the noted characteristics which it is believed may also be used, include those commercially available under the trademarks "Vespel" KS (an aramid resin available from the duPont Company), "Sparmon" (a polyimide resin available from Sparta Mfg. Co., Dover, Ohio), "Valox" 420 or 420-SEO (a glass reinforced, thermoplastic polyester available from the General Electric Co., Pittsfield, Mass.), "Ryton" (a polyphenylene sulfide available from Phillips Petroleum Co., Bartlesville, Okla.), and "Torlon" (a poly (amide-imide) resin available from Amoco Chemicals Corp., Chicago, Ill.).

As shown in FIG. 4, sidewalls 32 of valve member 30 are inclined relative to the center axis of discharge passageway 18 indicated at 55, at an angle 56 slightly greater (when unstressed) than the angle 58 of inclination of sidewalls 28 of the valve seat or discharge passage 18. An initial seal is achieved when the valve member closes to the position shown in FIG. 4, i.e., when the thin outer sealing periphery 60 of sidewall 32 first engages sidewall 28. Because the pressure differentials across the valve element are relatively small during most of the closure cycle, the primary closing force is that exerted by spring 44. Once an initial seal is achieved, however, a substantial pressure differential is created across the valve member as the compressor piston starts down from top dead center. This creates a substantial closing force which moves the valve member from the initial seal position of FIG. 4 to the fully seated position of FIGS. 2, 3 and 5. Edge portion 60 deforms and becomes stressed as this seating takes place. The stress in edge portion 60 improves the degree of sealing and facilitates opening, but should not be so much as to cause permanent deformation of the valve member.

The valve member and spring are preferably designed so that the upward force exerted by the valve member as it unstresses and moves from its fully seated position to that shown in FIG. 4 is significantly greater than the downward force exerted on the valve member by spring 44 during this initial opening movement. This significantly assists opening of the valve because as soon as the pressure differential across the valve member starts to reverse (i.e., after completion of the suction cycle and early in the discharge cycle) the residual stress in the valve member causes it to immediately spring off the valve seat (overcoming the force of spring 44) towards its FIG. 4 position. This in turn immediately exposes the full area of the valve member to opening pressure generated within the compression chamber. This exposure of a maximum effective area to opening or lifting pressure accelerates valve opening and permits higher speed operation. It should also be noted that the passage area between opposed sidewalls 28 and 32 will continue to increase as valve member 30 is moved upwardly, thereby providing an extremely large area for fluid discharge with a given size port area. This provides worthwhile increases in mass flow rate for a given compressor speed.

It should be noted that when the valve member is fully seated (as in FIGS. 2, 3 and 5) the effective area thereof exposed to the pressure differential is that defined by discharge passage 18, i.e., a considerably smaller area than that defined by the outer periphery of the valve. Because it is desirable to use as light a weight construction as possible to maximize valve acceleration, it is thereby possible to construct the valve sufficiently light (considering material strengths and structural design) that it need not be able to accommodate (without excessive or permanent deformation) the stresses which would result if the maximum pressure differential across the valve member was applied to the maximum area thereof when seated, so long as the valve member accommodates the maximum pressure differential acting across the smaller effective area thereof defined by the inner periphery of the discharge port. Stated conversely, the valve would have to be of much sturdier (and hence heavier) construction if, when seated, the entire cross-sectional area thereof was subjected to the pressure differentials thereacross. The relative angles of the valve member and seat also serve to cushion the impact of the parts on closing, thereby contributing (along with light weight) to the reduction of noise and wear.

It should be noted that valve member 30 will preferably have a thickness less than that of valve plate 12 in order to insure adequate sealing of sidewalls 32 with sidewalls 28 and to avoid a partial or complete annular groove being worn in sidewalls 32, which groove could possibly interfere with proper seating and/or sealing of valve member 30. Also, edge portion 60 will preferably be provided with a small radius or chamfer which operates to insure proper sealing even should valve member be shifted or cocked slightly during closing thereof. Additionally, spring 42 preferably has its end squared and ground and is of as large a diameter as possible relative to the diameter of valve member 30 so as to place the biasing force exerted thereby closely adjacent the sealing sidewalls 32 and to aid in preventing a shifting, tilting or other dislocation of valve member 30 during operation thereof.

While the present invention has been described with reference to FIGS. 1 through 4 utilizing a reed-type suction valve, it is also well suited for use with a conventional ring-type suction valve such as is shown in the embodiment indicated generally at 64 in FIG. 5. Valve assembly 64 includes a valve plate 66 having a relatively large irregularly shaped generally annular recessed portion 68 defining a suction plenum in the lower surface 70 thereof. A discharge opening 72 of frusto conical shape is also provided, being defined by a radially inwardly inclined or beveled sidewall 74 extending between upper surface 76 and lower surface 70 of valve plate 66. Surface 78 of sidewall 74 provides a valve seat for a discharge valve member 30' which is urged into sealing engagement therewith by gas pressure and a spring 44' extending between valve member 30' and a spring retainer 50' all of which are substantially identical to corresponding portions described above with reference to FIGS. 1 through 4.

A generally annular valve plate insert 80 is disposed within recess 68 through which fasteners 82 extend so as to secure valve assembly 64 to a cylinder housing 84. A plurality of spaced cutout areas or radially extending slots (not shown) are provided through valve plate insert 80 so as to allow suction fluid flow between radially inner and outer sides thereof.

A second insert in the form of an annular ring 86 is also provided, being received in an annular notch 88 provided in radially inward edge of lower surface 90 of valve plate insert 80, and being provided with a plurality of spaced radially inwardly extending reinforcing ribs 92 extending into engagement with surface 94 of sidewall 74. This is best shown in FIG. 6, in which is shown in bottom plan a different version of the discharge valve, but with a ring-type suction valve of the same construction as the present embodiment.

The terminal end 96 of sidewall 74 is positioned in coplanar relationship with lower surface 70 of valve plate 66, lower surface 90 of valve plate insert 80 and lower surface 98 of annular ring 86. A suction reed valve member 100 in the form of an annular ring sealingly engages lower surfaces 96 and 98 so as to prevent passage of fluid between insert ring 86 and surface 94 into compression chamber 102. A central opening 104 is provided in suction reed valve member 100 which is arranged coaxially with discharge opening 72 so as to allow direct fluid communication between compression chamber 102 and lower surface 34' of discharge valve member 30'. As best seen with reference to FIG. 6, suction reed valve member 100 also has a pair of diametrically opposed radially outwardly extending tab portions 108 and 110, each of which is provided with a suitable opening 112 extending therethrough. As seen in FIG. 5, tab portions 108 and 110 are received in respective notched portions 114 and 116 of cylinder housing 84 with fasteners 82 extending through openings 112 so as to retain suction reed valve member 100 in operative relationship thereto.

As the reciprocating piston (not shown) disposed within compression chamber 102 moves away from valve assembly 64 during a suction stroke, the pressure differential between compression chamber 102 and suction plenum 68 will cause suction reed valve member 100 to deflect inwardly with respect to compression chamber 102 thereby enabling fluid flow from suction plenum into compression chamber 102 through inlet passages 106. Because only tab portions 108 and 110 of suction reed valve member 100 extend outwardly beyond the sidewalls 118 of compression chamber 102, suction fluid will readily flow into chamber 102 between suction reed valve member 100 and both surfaces 98 and 96 around substantially the entire inner and outer peripheries of suction valve member 100. As a compression stroke of the piston begins, suction valve 100 will be forced into sealing engagement with surfaces 96 and 98 and the discharge valve member will begin to operate in the manner described above with reference to FIGS. 1 through 4. Thus, as a result of this concentric arrangement substantially the entire available surface area overlying compression chamber 102 is utilized for suction and discharge valving and porting, thereby allowing maximum fluid flow both into and out of compression chamber 102.

Referring now to FIGS. 6 and 7, another embodiment of the present invention is illustrated which allows for even further utilization of the valve plate surface area overlying the compression chamber by providing a second concentrically arranged discharge port area. With the exception of the discharge valve member and spring retainer, the various elements and portions of the suction and discharge valve assembly 120 are substantially identical to the corresponding portions of valve assembly 64 of FIG. 5 and therefore the same numerals are employed to designate identical portions and further description thereof is believed unnecessary.

A discharge valve member 122 is provided disposed within discharge passage 72. Discharge valve member 122 is similar to discharge valve member 30, being preferably fabricated from a polymeric composition having the aforementioned characteristics and having a frusto conical shape including outwardly diverging sidewalls 124, a lower surface 126, and an upper surface 128. However, in this embodiment valve member 122 also is provided with a centrally located generally frusto conically-shaped opening 130 defined by upwardly converging sidewalls 132. A frusto conical disc member 134 having upwardly converging sidewalls 136 is also provided which is secured to and supported by a cylindrical stud member 138. Stud member 138 has an upper threaded portion 140 which extends through a threaded opening 142 provided in a spring retainer member 144 and cooperates therewith to enable a lower surface 146 of disc member 134 to be adjusted into substantially coplanar relationship with lower surfaces 70 and 126 of valve plate 66 and discharge valve member 122 respectively. Retainer member 144 also serves to limit opening movement of valve member 122.

As previously mentioned with regard to discharge valve member 30, conical sidewall 124 of discharge valve member 122 is preferably formed with an included angle (when unstressed) greater than the included angle of the cone of sidewall 78. In like manner and for the same reasons, the included angle of conical sidewall 132 is greater (when unstressed) than the included angle of the cone of sidewall 136.

The operation of valve assembly 120 is substantially the same as that of valve assembly 64 described above except that as discharge valve member 122 is caused to move upwardly, compressed fluid will be able to exhaust between both sidewalls 78 and 124 and between sidewalls 132 and 136. This arrangement thereby offers substantially increased discharge flow rates to be achieved within the relatively restricted head area for a given cylinder size by providing means whereby the discharge port area is substantially increased. On the other hand, this arrangement is harder to manufacture because of the close tolerances required between the two separate seats in order to get a good seal.

FIG. 8 illustrates a valve assembly 146 also in accordance with the present invention employing the discharge valve arrangement of FIG. 6 in conjunction with a reed-type suction valve of the type described with reference to the embodiment of FIGS. 1 through 4. Accordingly, as the elements employed in this embodiment and the operation thereof are substantially identical to corresponding elements of FIGS. 1 through 4 and 6, like portions have been indicated by like numerals double primed and further description thereof is believed unnecessary.

FIG. 9 illustrates an alternative embodiment of the present invention, indicated generally at 148, in which the additional porting is provided over that of the embodiment of FIGS. 1-5. Valve assembly 148 comprises a valve plate 150 having a conventional reed-type suction valve member 152 engaging the lower surface 154 thereof and a frusto conical discharge opening defined by upwardly diverging sidewalls 158 extending therethrough, all of which is substantially identical to that described with reference to FIGS. 1 through 5 above.

In this embodiment, however, a two-piece discharge valve assembly is provided comprising a first frusto conical discharge valve member 160 having upwardly diverging sidewalls 162 adapted to sealingly engage sidewalls 158, an annular recess 164 provided in upper surface 166 thereof, and a centrally disposed frusto conical shaped opening defined by sidewalls 168 provided within recess 164. A second relatively movable frusto conical shaped discharged valve member 170 is provided having upwardly diverging sidewalls 172 adapted to sealingly engage sidewalls 168. Discharge valve member 170 has a recess 174 provided in upper surface 176 thereof which is adapted to receive one end of a biasing spring member 178 the other end of which engages a shoulder 180 provided on depending protrusion 182 of spring retainer 184. A second spring biasing member 186 has one end received in recess 164 of discharge valve member 160 and the other end engaging an annular recess 188 surrounding protrusion 182 of spring retainer 184. Thus, spring biasing members 178 and 186 can operate independently to bias respective discharge valve members 170 and 160 into closed sealing engagement. Spring retainer 184 may also have stop means in the form of an annular shoulder 190 which is positioned to engage upper surface 166 of discharge valve member 160 while allowing continued upward movement of discharge valve member 170.

As is apparent, the relative sequence of opening of discharge valve members 160 and 170 may be easily selected by merely selecting the desired respective spring characteristics, using standard criteria. Both discharge valve members 160 and 170 preferably are fabricated from a suitable polymeric composition having the aforementioned characteristics, have a thickness sufficient to provide the necessary strength but less than the thickness of valve plate 150, and have both conical valve seats having included angles which are greater (when unstressed) than the included angles of the respective valve seat sidewalls. Further, the relative diameters of discharge valve members 160 and 170 will be such as to provide a substantially planar lower surface with surface 154 of valve plate 150.

With respect to the relative angles of incline of the respective valve members and valve seats, applicant has obtained excellent test results with valve members having an unstressed sidewall angle with respect to the axis of the valve seat or discharge passageway equal to approximately 47° (an included angle of 94°), with a corresponding valve seat angle of 45° (an included angle of 90°). These approximate relative angles apply to all of the disclosed embodiments of the invention, regardless of whether the valve member/valve seat interface is on the outside periphery of the valve member or on the inside periphery of the valve member.

The significant performance improvements obtained using the aforedescribed preferred embodiment of the discharge valve (when substituted for existing discharge valves in current refrigeration compressors), are also believed to be obtainable using other than polymeric materials. For example, in FIGS. 10-15, there are illustrated several different lightweight designs in which the valve member is formed from metal, and which are believed to also provide the advantages of the present invention. In all of these embodiments the valve plate is indicated at 212, the discharge port or passageway at 218, the frusto conical valve seat at 228 and the helical compression spring at 244.

In FIG. 10 the valve member, indicated generally at 230, is formed, such as by stamping from sheet metal, into the frusto conical form illustrated, having a generally flat centered disc portion 232 and upwardly and outwardly extending conical side walls 234, the outside surfaces of which sealingly engage valve seat 228 in exactly the same manner as those of the previously described valve members. Valve member 230 is contoured so that spring 244 will engage same at approximately the intersections of portions 232 and 234. The embodiment of FIG. 11 is generally similar to that of FIG. 10 with the valve member, indicated at 246, also being stamped or similarly formed out of sheet metal, but is provided with an upstanding outer peripheral flange 248 defining an internal shoulder for engaging and locating spring 244. FIG. 12 illustrates a generally similar valve member, indicated at 250, which differs from the preceding embodiment in that a definite annular pocket 252, having both bottom and side walls, is defined adjacent the outer periphery of the valve member for positioning and engaging spring 244. The embodiment of FIG. 13 comprises a valve member 254 which is essentially the same as that illustrated in FIG. 12 but is contoured or relieved to minimize the weight thereof. As can be seen, the metal of centered disc portion 232 is in great part substantially thinner, reinforcing being provided by integral ribs 256 and 258. The embodiments of FIGS. 12 and 13 may be formed by cold heading. Other manufacturing techniques, such as casting, may be applicable to any of the metal embodiments, as will be appreciated by one skilled in the art. In all of the above embodiments it is envisioned that the valve member will be formed out of a single piece of metal, such as steel, bronze, aluminum, or the like.

It is envisioned that a valve member embodying the principles of the present invention may also be fabricated in composite form in the manner illustrated in FIGS. 14 and 15. In both of these figures the valve member itself, indicated at 260, is substantially the same as that shown in FIG. 10, although of slightly lesser guage, with stiffening and strength being provided by a thickened or filled center section 262 formed of an extremely lightweight rigid material (such as, for example, rigid form, metal honeycomb, or the like) securely bonded to valve member 260 and provided with a suitable reinforcing and protecting sheath 264 bonded to the opposite surface thereof and rigidly affixed to the inside surface of valve member 260, such as by brazing. Center section 262 interconnects valve member 260 to sheath 264 so that they act as a single beam. Sheath 264 and member 260 may be formed of any of the aforedescribed metals, and preferably sheath 264 defines an annular recess 266 to locate and engage spring 244.

In all of the embodiments illustrated in FIGS. 10 through 15 the respective angles of the valve seats and the outer surface of side walls 234 are identical to those described in the preceding embodiments, and the thickness of the side wall portion 234 is chosen (for the metal used) to provide as light a weight as possible, as well as the compliance or resilience necessary to permit the valve member to close and seal without permanent deformation. Similarly, center disc portion 232 is formed as light as possible but of a sufficient thickness and strength for the material used (in combination with center stiffening section 262 where applicable) to provide a substantially flat flush surface (i.e., no excessive distortion or permanent deformation) at the top of the cylinder chamber when fully closed and subjected to the maximum pressure differentials normally encountered, the same as in the case of the preceding embodiments. In all of the embodiments formed from metal, the resulting valve member, whether it be of unitary construction or of composite construction, is extremely light weight compared to known conical valves and is believed to be capable of providing the advantages of the previously described polymeric valve elements, particularly those disclosed in FIGS. 1 through 5. Ideally, the valve members of FIGS. 10 through 15 will be formed in such a way and with such geometry and of a material which will provide the characteristics achieved by applicant with the aforedescribed preferred form of the valve member. Although metal valve members may be slightly noisier than polymeric valves, the progressive engagement of valve member and valve seat due to the relative angle thereof is believed to provide some degree of noise attenuation.

One of the advantages of the valve of the present invention is that, unlike reed valves, the weight or mass of the valve is independent of the force of the return spring (i.e., spring 44, 44', 44'', etc.). This makes it possible to choose the spring to optimize valve frequency (to achieve closure as close to top dead center as possible) and/or valve preload (i.e., the initial sealing force in absence of a pressure differential). Because one of the more important functions of the return spring is to stabilize the valve as it is cycled in response to changing pressure differentials, the spring is preferably of as large a diameter as is feasible.

In all embodiments of the invention the valve plate is utilized in the compressor in a conventional manner, and the pistons, cylinders, suction valves, manifolds, etc. are conventional. If desired, the top of the piston may be very slightly contoured to fill the small, thin space in the center of the suction valve when the piston is at top dead center, thereby further reducing reexpansion volume. Also, the bridges may have three legs instead of two in order to increase flow area.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

I claim:

1. An improved pressure responsive valve assembly comprising:

a valve plate having an inner surface in part defining a compression chamber;

a discharge valve seat opening extending through said valve plate, said valve seat opening being defined by an outwardly diverging conical sidewall;

a frusto conical discharge valve member disposed within said opening and having a peripheral edge surface of conical configuration adapted to sealingly engage said sidewall of said valve seat opening, said conical peripheral edge surface of said discharge valve member having an included angle when unstressed which is greater than the included angle of said conical sidewall of said valve seat opening; and means defining an opening through said discharge valve member, and sealing means sealingly engaging the sidewall of said opening in said valve member when said discharge valve member is in a closed position so as to prevent fluid flow through said discharge valve seat opening, said sealing means and discharge valve member being movable relative to one another to allow additional discharge fluid flow when said discharge valve member is in an open position.

2. A valve assembly as claimed in claim 1, wherein said sealing means comprises a frusto conically-shaped disc member sealingly disposed in said opening in said discharge valve member.

3. A valve assembly as claimed in claim 2, wherein said sealing means and said valve member each have inner surfaces which are coplanar with said inner surface of said valve plate when said valve member is in a closed position.

4. A valve assembly as claimed in claim 1, wherein said sidewall of said opening through said valve member and the outer peripheral surface of said sealing means are conical in configuration.

5. A valve assembly as claimed in claim 4, wherein the unstressed included angle of said conical sidewall of said opening through said valve member is slightly different than the included angle of said conical surface of said sealing means.

6. A valve assembly as claimed in claim 5, wherein said conical sidewall of said opening through said valve member has the greater included angle.

7. A valve assembly as claimed in claim 5, wherein said conical surface of said sealing means has the greater included angle.

8. A valve assembly as claimed in claim 1, wherein said opening in said discharge valve member is defined by outwardly converging sidewalls.

9. A valve assembly as claimed in claim 8, further comprising support means fixedly supporting said sealing means relative to said valve plate.

10. A valve assembly as claimed in claim 9, wherein said support means comprises a stud portion projecting outwardly from said sealing means, and retention means affixed to said valve plate, said stud member being threadedly and adjustably connected to said retention means.

11. A valve assembly as claimed in claim 10, wherein said spring means comprises coil spring means disposed coaxially of said stud portion and extending between said retention means and said valve member.

12. A valve assembly as claimed in claim 8, wherein said discharge valve member is of a thickness less than the thickness of said valve plate.

13. A valve assembly as claimed in claim 8, wherein said discharge valve member is of a polymeric composition.

14. A valve assembly as claimed in claim 13, wherein said polymeric composition is a resin selected from the group consisting of polyimide, aramid, polyester, polyphenylene sulfide, and poly (amid-imide).

15. A valve assembly as claimed in claim 1, wherein said sealing means is movable relative to said valve plate and to said discharge valve member.

16. A valve assembly as claimed in claim 1, wherein said opening in said discharge valve member is defined by outwardly diverging sidewalls.

17. A valve assembly as claimed in claim 16, wherein said sealing means has an outwardly diverging peripheral edge sealingly engaging said sidewall of said opening through said valve member, said edge diverging at an angle relative to the axis of said discharge valve seat opening greater than the corresponding angle of said opening in said valve member when the respective parts are unstressed.

18. A valve assembly as claimed in claim 1, wherein said sealing means and said discharge valve member are of a polymeric composition.

19. A valve assembly as claimed in claim 18, wherein said polymeric composition is a resin selected from the group consisting of polyimide, aramid, polyester, polyphenylene sulfide, and poly (amide-imide).

20. A valve assembly as claimed in claim 1, further comprising retention means mounted to said valve plate, said spring means being disposed between said retention means and said sealing means for biasing the latter into sealing engagement with said opening in said valve member.

21. In combination with a gas compressor, an improved pressure responsive valve assembly, comprising:
a valve plate having an inner surface in part defining a compression chamber;
a discharge port extending through said valve plate;
means defining a first valve seat of circular cross-section in said port, said first valve seat being of increasing diameter in a direction away from said compression chamber; and
a discharge valve member formed of a relatively compliant polymeric composition disposed within said port and having a peripheral edge surface adapted to sealingly engage said first valve seat, said peripheral edge surface of said discharge valve member and first seat opening being configured so that a larger diameter portion of said peripheral edge surface engages said first valve seat first during closure, whereby complete seating occurs incident to distortion of said discharge valve member, said valve member being annular and having a seating surface concentric with and disposed radially inwardly of said peripheral edge surface for engaging a second valve seat which is substantially conical and concentric with said first valve seat and positioned radially inwardly of the first valve seat.

22. The combination of claim 21, wherein said valve member peripheral edge surface and said seating surface are configured so that the peripheral edge surface portion of largest diameter and the seating surface portion of smallest diameter engage their respective valve seats first during valve closure, whereby complete closure occurs incident to distortion of the valve member.

23. The combination of claim 21, further comprising a coaxial port in said valve member defined by said seating surface, said seating surface diverging in said direction away from said compression chamber and being adapted to cooperate with a second discharge valve member.

24. The combination of claim 23, wherein said first and second valve members are independently spring biased toward the closed positions thereof.

25. The combination of claim 21, further comprising a coaxial port in said valve member defined by said seating surface, said seating surface converging in said direction away from said compression chamber and being adapted to cooperate with said second valve seat which also converges in said direction away from said compression chamber.

26. The combination of claim 25, wherein said valve member is spring biased toward a closed position wherein said peripheral edge surface engages said first valve seat and said seating surface engages said second valve seat.

27. A discharge valve element for use in a gas compressor having a valve plate equipped with an inner surface in part defining a compression chamber, a discharge port defined by first and second valve seats and extending through said valve plate, said first valve seat diverging outwardly from said inner surface and said second valve seat converging outwardly from said inner surface, said valve element having an outwardly diverging first seating surface and an outwardly converging second seating surface concentrically disposed relative to said first seating surface, said valve element being composed of a relatively compliant material and being capable of distorting to conform to said first and second valve seats with an inner surface of said valve element lying substantially in the plane of said inner surface of said valve plate when the discharge valve element is closed, said distortion resulting in a reactive force tending to unseat said discharge valve element.

28. A discharge valve assembly for use in a gas compressor having a valve plate equipped with an inner surface in part defining a compression chamber, a discharge port extending through said valve plate and defining a valve seat diverging outwardly from said inner surface, said discharge valve assembly including a first valve element having an outwardly diverging first seating surface and a coaxial port extending therethrough, said coaxial port defining by a second seating surface diverging outwardly from said inner surface and adapted to engage a second valve element, said first and second valve elements being composed of a relatively compliant material and being capable of distorting to conform to said valve seat and said second seating surface, respectively, with an inner surface of said first and second valve elements lying substantially in the plane of said inner surface of said valve plate when the discharge valve assembly is closed, said distortion resulting in a reactive force tending to unseat said first and second valve elements.

29. A discharge valve assembly according to claim 28, wherein said first and second valve elements are independently spring biased toward the closed positions thereof.

* * * * *

UNITED STATES PATENT AND TRADEMARK OFFICE
CERTIFICATE OF CORRECTION

PATENT NO. : 4,478,243
DATED : October 23, 1984
INVENTOR(S) : Robert W. King

It is certified that error appears in the above-identified patent and that said Letters Patent is hereby corrected as shown below:

Column 8, line 13, "discharged" should be -- discharge --.

Column 9, line 47, "form" should be -- foam --.

Column 11, line 60, "amid" should be -- amide --.

Signed and Sealed this

Eighteenth Day of June 1985

[SEAL]

Attest:

DONALD J. QUIGG

Attesting Officer    Acting Commissioner of Patents and Trademarks